US011763064B2

(12) United States Patent
Jain et al.

(10) Patent No.: US 11,763,064 B2
(45) Date of Patent: Sep. 19, 2023

(54) GLYPH ACCESSIBILITY AND SWASH CONTROL SYSTEM

(71) Applicant: Adobe Inc., San Jose, CA (US)

(72) Inventors: Ashish Jain, Ashok Vihar (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/513,101

(22) Filed: Oct. 28, 2021

(65) Prior Publication Data

US 2023/0140498 A1 May 4, 2023

(51) Int. Cl.
*G06F 3/048* (2013.01)
*G06F 40/109* (2020.01)
*G06F 3/0482* (2013.01)

(52) U.S. Cl.
CPC ............... *G06F 40/109* (2020.01); *G06F 3/0482* (2013.01)

(58) Field of Classification Search
CPC .................................................. G06F 40/109
See application file for complete search history.

(56) References Cited

U.S. PATENT DOCUMENTS

| 2010/0189362 | A1* | 7/2010 | Jakubiak et al. | G06F 40/129 382/203 |
| 2017/0322913 | A1* | 11/2017 | Kukreja et al. | G06F 3/0236 |
| 2020/0272689 | A1* | 8/2020 | Kumawat et al. | G06K 9/6232 |

* cited by examiner

*Primary Examiner* — Claudia Dragoescu
(74) *Attorney, Agent, or Firm* — FIG. 1 Patents

(57) ABSTRACT

Glyph accessibility techniques are described. In an example, the glyph management system obtains alternate glyphs of glyphs from an input glyph sequence. The glyph management system then determines a swash type of swashes included in respective alternate glyphs. The swash type is used to generate candidate glyph sequences using one or more rules. The candidate glyph sequences are usable to replace an input glyph sequence in the user interface.

20 Claims, 16 Drawing Sheets

First Rule 1502
"Avoid swash in the middle of a sequence if compromises legibility"

Second Rule 1504
"Use Sparingly"

Third Rule 1506
"Avoid Using All Caps"

1900

1902

Conventional Default Styles

1904

Candidate Styles

Fig. 19

GLYPH ACCESSIBILITY AND SWASH CONTROL SYSTEM

BACKGROUND

Digital content creation systems continue to expand the ways in which text and other characters are expressed as part of digital content. A digital content creation system, for instance, typically supports a variety of different scripts, e.g., Latin, Roman, Greek, and so forth. Each of these scripts includes hundreds and even thousands of different fonts. Fonts are arrangeable in font families referred to as "typefaces" to support variations, such as extra bold, bold, regular, italics, and so forth. Glyphs are used as part of the font to represent individual characters, letters, numbers, punctuation, and other symbols. Fonts typically include hundreds and even thousands of different glyphs.

Font formats have also continued to expand to increase availability of glyph alternatives. For example, OpenType fonts support alternates for potentially thousands of different glyphs. Glyph alternates are combinable with standard characters of a font in order to increase readability, comply with a desired level of formality, and/or create a typographic personality for different instances of digital content, e.g., digital documents, webpages, and so forth. A content creator, for instance, accesses a digital content creation system to specify combinations of alternate characters as substitutes for default characters in order to create a natural and less repetitive flow in text expressed in a digital content, such as for instances that mimic handwriting, calligraphy, and so on.

Although availability of alternate glyphs continues to increase due to an extended character set made available by font formats, techniques used to support accessibility to these alternate glyphs have not. This is due to a lack in uniformity in how glyphs and alternate glyphs are categorized within a font, because fonts are built and organized depending on the whims of a font designer.

Fonts, for instance, vary in real world scenarios in how glyphs are organized across subcategories. Examples of subcategories include contextual, stylistic, titling alternatives, discretionary ligatures, swash characters, small caps, as well as ornaments, flourishes, symbols, punctuation, accented characters, alternatives for numerals, and so forth. Additionally, consistency even in these subcategories differs and therefore access across different types of fonts also differs as this is left to a font designer to interpret how these different subcategories correspond to different glyphs. Accordingly, user access to these alternates is inefficient and complicated when confronted with thousands of potential glyphs even for a single font, not readily performable by a human being due to the complexity and variance between types of fonts, and results in inefficient use of computational resources of computing device that implement these conventional techniques in order to support repeated access to the glyph alternatives.

SUMMARY

Glyph accessibility techniques are described as implemented by a digital content processing system to improve user efficiency and computational resource consumption in accessing glyphs and glyph alternates. In an example, the glyph management system obtains alternate glyphs of glyphs from an input glyph sequence. The glyph management system then determines a swash type of swashes included in respective alternate glyphs. To do so, the glyph management system extracts vector representations of the input glyph and the alternate glyphs. A medial axis representation is extracted by the glyph management system to generate a vector representation of the input glyph and vector representations of alternate glyphs. A medial axis is determined for these representations, which is then used to align the representations.

Once aligned, the glyph management system uses a correspondence estimation between the vector representations using an A-B correspondence from the vector representation of the input glyph to respective vector representations of alternate glyphs. The correspondence estimation identifies a set of points from the vector representations of the alternate glyphs that are not in the base glyph. The glyph management system then determines a swash type of the swash based on this set of points.

Identification of the addition (e.g., the swash) and the direction of the addition supports a variety of functionality of the glyph management system. In one example, the glyph management system generates a candidate glyph sequence, automatically and without user intervention, for replacement of the input glyph as part of a glyph sequence. The glyph detection system, for instance, leverages a direction of the addition (e.g., swash) along with a plurality of rules to generate candidate glyph sequences.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 19 contrasts candidate styles of candidate glyph sequences generated using the techniques described herein that are legible and visually pleasing as opposed to default styles that are illegible.

DETAILED DESCRIPTION

Overview

Figure 1:
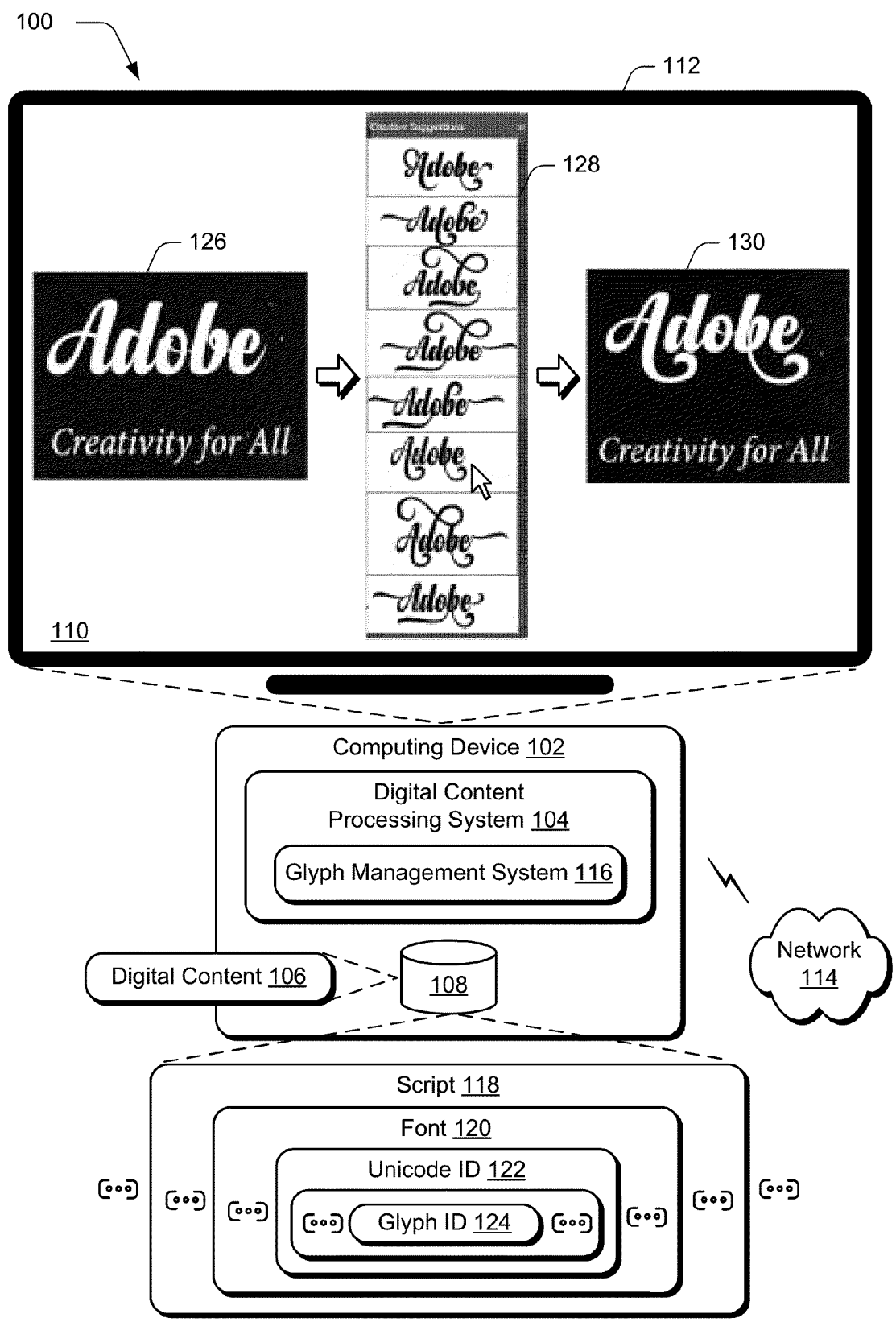
FIG. 1 is an illustration of an environment in an example implementation that is operable to employ glyph accessibility techniques described herein.

Extended character sets made available by font formats such as OpenType have increased availability of alternate glyphs in corresponding fonts such that even a single font may include thousands of alternatives. However, conventional techniques used to access these alternate glyphs are cumbersome. This is due to a lack in uniformity in how glyphs and alternate glyphs are categorized within a font because fonts are built and organized by a corresponding font designer and are not standardized. As such, access to the potentially thousands of alternate glyphs included as part of a single font is difficult to achieve manually by a user through interaction with digital content processing systems that support these font formats.

Accordingly, glyph accessibility techniques are described as implemented by a digital content processing system to improve user efficiency and computational resource consumption in accessing glyphs and glyph alternates. In these techniques, a glyph management system is utilized to locate candidate glyphs of interest, automatically and without user intervention, based on an input glyph. In this way, the techniques automate navigation and search through the potentially thousands of different glyphs available from a single font, thereby improving user interaction with a computing device that implements these techniques as well as improve computational efficiency in the implementation of these techniques by respective computing devices.

Alternate glyphs are located by the glyph management system as having a visual characteristic used to supplement a base glyph. In one example, this is a swash that is a visually extended flourish that is added to the base glyph. A variety of types of swashes are configurable as additions to a base glyph, examples include a beginner swash extending from a left side of the glyph, a terminal swash extending from a right side of the glyph, an ascender swash extending from a top side of the glyph, and a descender swash extending from a bottom side of the glyph.

The glyph management system begins by first obtaining alternate glyphs, e.g., based on glyphs that share a Unicode ID with a base glyph selected in a user interface. The glyph management system then determines a swash type of swashes included in respective alternate glyphs. This is performable in a variety of ways. The glyph management system, for instance, extracts vector representations of the input glyph and the alternate glyphs. A medial axis representation is extracted by the glyph management system (e.g., using a skeleton technique) to generate a vector representation of the input glyph and vector representations of alternate glyphs. A medial axis is determined for these representations, which is then used to align the representations and overcome conventional challenges caused by rotations of the glyphs and therefore improve accuracy.

Once aligned, the glyph management system uses a correspondence estimation between the vector representations using an A-B correspondence from the vector representation of the input glyph to respective vector representations of alternate glyphs. The correspondence estimation identifies sets of points from the vector representation of the input glyph that corresponds to sets of points of the respective vector representations of alternate glyphs. This also identifies an additional set of points from the vector representations of the alternate glyphs that are not in the base glyph and thus identify extensions of that glyph, e.g., the swashes in this example.

The glyph management system then determines a swash type of the swash, e.g., based on a direction associated with the swash. To do so, a bounding box is formed from the base glyph by determining left, right, top, and bottom extremes. From this, the glyph management system determines the direction associated with the swash (i.e., the addition to base glyph) by ascertaining a relationship of the addition (e.g., the swash) to the bounding box, and more particularly to respective regions of corresponding sides of the bounding box.

From the additional set of points identified for the alternate glyph above, for instance, a determination is made as to various dense zones defined at the respective sides of the bounding box in the form of point clusters using density-based clustering. A convex hull is formed for these point clusters, and intersection of the convex hull with respective left, right, top, and bottom zones associated with respective sides of the bounding box is determined. This intersection information is leveraged by the glyph management system to determine a direction associated with the swash and therefore a corresponding swash type, e.g., beginner, terminal, ascender, or descender swash type, respectively, as described above.

Identification of the addition (e.g., the swash) and the direction of the addition (i.e., it's type in this example) supports a variety of functionality of the glyph management system. In one example, the glyph management system generates candidates, automatically and without user intervention, for replacement of the input glyph as part of a glyph sequence. Because the swash is configured as an addition to the base glyph, incorporation of alternate glyphs having the swash introduces challenges involving legibility with respect to other glyphs in sequence with the input glyph. As such, manual inclusion and configuration of alternate glyphs, especially when confronted with the thousands of different alternate glyphs that are available in some instances, is time consuming, inefficient, causes user frustration, and results in inefficient use of computational resources.

Accordingly, the glyph management system is configured to generate candidate glyph sequences, automatically and without user intervention, based on the alternate glyph that is to be added to a glyph sequence. The glyph detection system, for instance, leverages a direction of the addition (e.g., swash) along with a plurality of rules to generate candidate glyph sequences based on an input glyph and corresponding glyph sequence which included the input glyph along with alternate glyphs identified for the input glyph. Examples of rules include use of swashes in a sequence, what swash types are permitted at a beginning and/or end of the sequence, and so on. The candidate glyph sequences are then output in a user interface, which are user selectable to replace the input glyph sequence as part of the digital content. In this way, efficiency of user interaction and computational resources used to support this interaction is improved with respect to the potentially thousands of different alternate glyphs available via the system. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ glyph accessibility techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 21.

The computing device 102 is illustrated as including a digital content processing system 104. The digital content processing system 104 is implemented at least partially in hardware of the computing device 102 to create, process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Examples of digital content 106 include webpages, digital documents, user interfaces as output through execution of an application, and so forth. Although illustrated as implemented locally at the computing device 102, functionality of the digital content processing system 104 is also configurable as whole or part via functionality available via the network 114, such as part of a web service or "n the cloud."

An example of functionality incorporated by the digital content processing system 104 to process the digital content 106 is illustrated as a glyph management system 116. Scripts 118 correspond to collections of letters, numbers, and symbols, e.g., Latin, Greek, and so on. Accordingly, scripts 118 include a multitude of fonts 120, which is a set of the letters, numbers, and symbols of the script in a particular style and size. Glyphs are elemental symbols with respective fonts 120 corresponding to individual instances of the letters, numbers, and symbols in the particular style and size for the font. The glyphs are identifiable using a respective Unicode identifier (ID) 122, i.e., Unicode value. Unicode is a standard used to promote consistent encoding, representation, and management of the letters, numbers, and symbols of glyphs across different types of fonts 120. Glyph identifiers (ID) 124 are used to identify different glyphs corresponding to a same Unicode ID 122, e.g., a base glyph and alternate glyphs.

Figure 20:
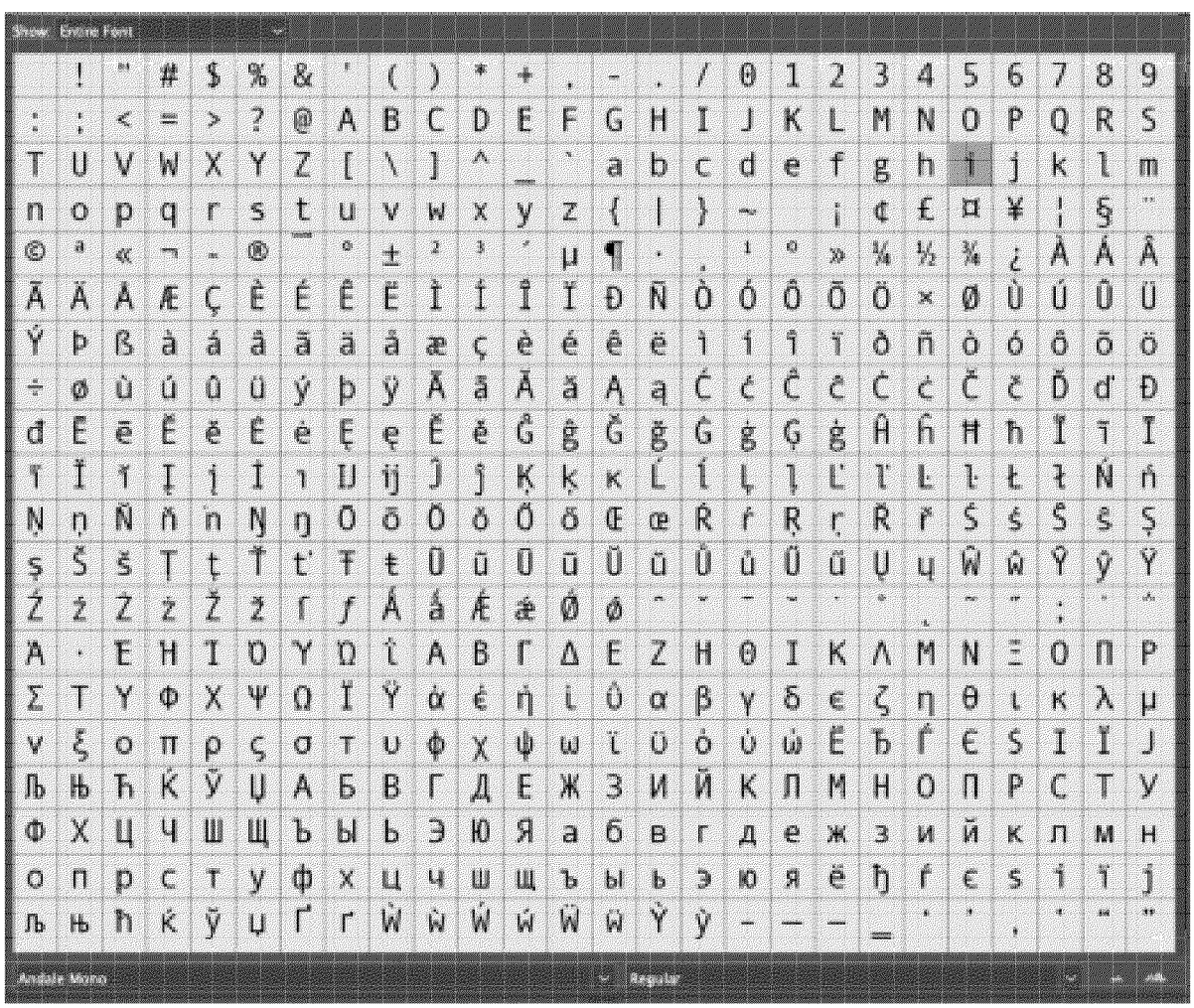
FIG. 20 depicts an example of alternate glyphs available for a base glyph.

As previously described, extended character sets made available by font formats such as OpenType have made it possible to include thousands of alternate glyphs for a single font. However, conventional techniques to locate these alternate glyphs are challenging and prone to error. As illustrated in an example implementation 2000 of FIG. 20, for instance, a partial list of glyphs available for a single font is shown. This partial list includes a base glyph (e.g., "A,") as well as alternatives to these glyphs, e.g., "À," "Á," "Â," "Ã," "Ä," "Å," "Æ," and so on. As illustrated the base glyph and the alternate glyphs are spread out and scattered in the user interface. As such, manual determination on the part of a user as to which alternate glyphs are available and contain desirable features (e.g., swashes) and how to access to these glyphs is difficult and inefficient as implemented using conventional techniques.

An increasing number of fonts 120 include alternate characters - that is, different versions of a glyph in addition to the one designated as "standard" or "default" by a typeface designer. Typical default glyphs that are chosen by the typeface designer, however, are often ordinary and have a lackluster-type treatment. One technique used by content creators is to employ additional visual cues (e.g., embellishments) to the default glyphs to enhance and alter an appearance of the base glyph. An example of this is a swash, which typically appear at the beginning or end of a glyph (also referred to as beginner and terminal swashes), and are also configured as ascenders and descenders, e.g., as attached to crossbars and glyph apexes.

The incorporation of swash glyphs into a setting is typically employed by a content creator to draw attention to and embellish the digital content 106. The use of swashes is common in invitations, logos and product branding, packaging, movie titles, book covers, magazines, web sites, and so forth. The tasteful and legible use of swashes as part of base glyphs helps a content creator to avoid overusing repeated forms, and make a customized setting, give an appearance of hand lettering, and so on. As previously described, fonts are built and organized differently by respective font designers. As such, glyphs within a font 120 are includable in various subcategories defined by the font designers, such as swash, contextual or stylistic alternates. Because of this, a content creator is tasked with a great deal of experimentation in conventional techniques to find the "right kind" of stylistic glyph alternate (e.g., swash) to be used to transform a glyph.

Accordingly, the glyph management system 116 is implemented by the digital content processing system 104 to support efficient user access to alternate glyphs, e.g., having swashes in this example. For example, an input glyph sequence 126 is output by a digital content processing system 104 that includes a plurality of glyphs. The glyph management system 116 is configured to, automatically and without user intervention, identify alternate glyphs based on base glyphs included in the input glyph sequence, determine characteristics of additions made to the base glyphs by the alternate glyphs, and from this generate a plurality of candidate glyph sequences 128 that include different combinations of base and alternate glyphs. Selection of a particular one of the candidate glyph sequences 128 causes the input glyph sequence to be replaced by the candidate glyph sequence 130 in the digital content 106. Other examples are also contemplated, including options to change fonts, options to "lock" a particular alternate glyph in a candidate to produce additional candidates based on other glyphs in the sequence having the "locked" base or alternate glyph, and so on. This is performed automatically and without user intervention by the glyph management system 116 and therefore provides access to the thousands of different glyphs available from even a single font. Further discussion of these and other examples is included in the following section and shown in a corresponding figure.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Glyph Accessibility and Swash Control Techniques

Figure 2:
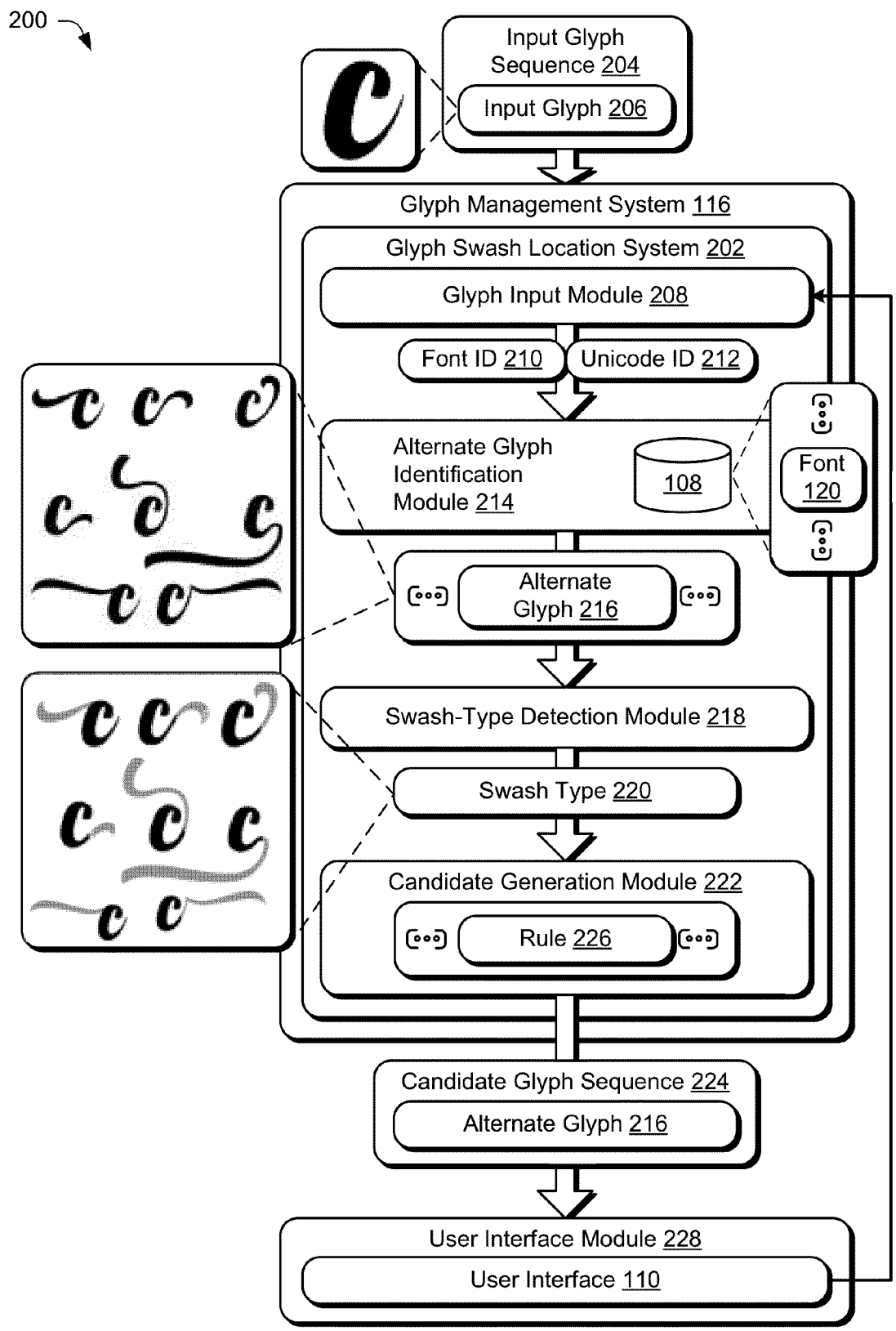
FIG. 2 depicts a system in an example implementation showing operation of a glyph management system of FIG. 1 in greater detail.
Figure 3:
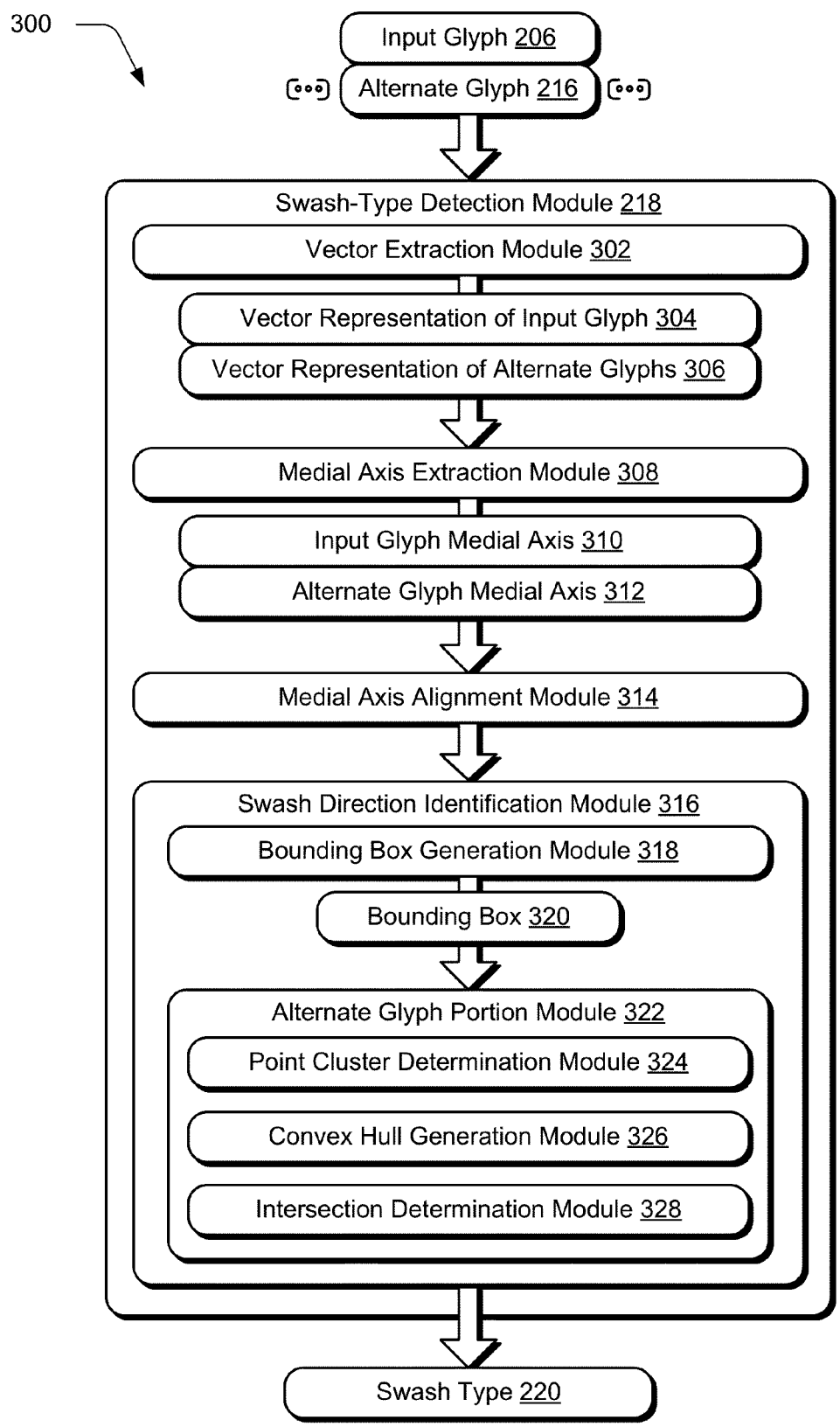
FIG. 3 depicts a system in an example implementation showing operation of a swash-type detection module of FIG. 2 in greater detail.
Figure 4:
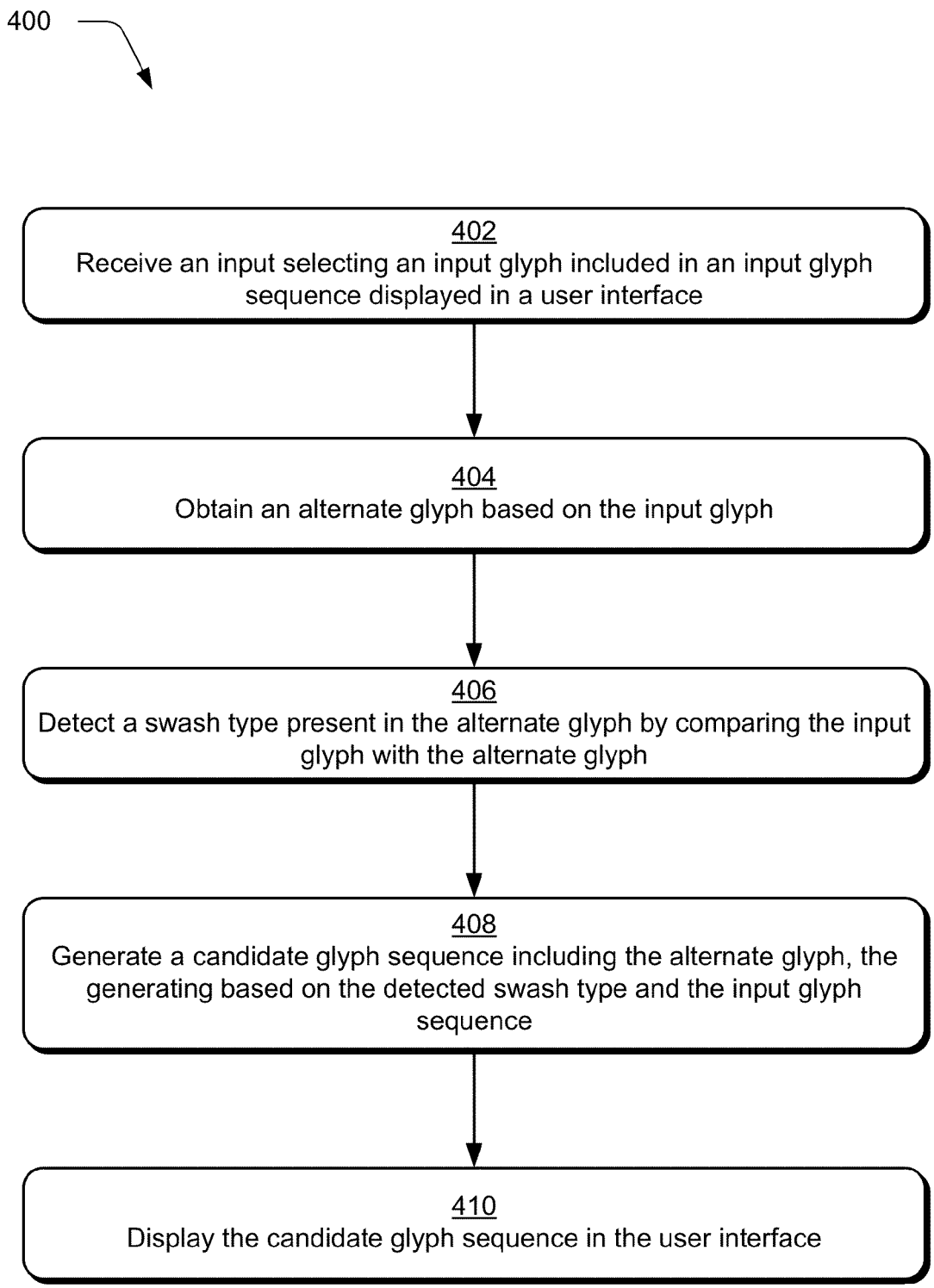
FIG. 4 is a flow diagram depicting a procedure in an example implementation of obtaining an alternate glyph, detecting a swash type, and generating a candidate glyph sequence.
Figure 5:
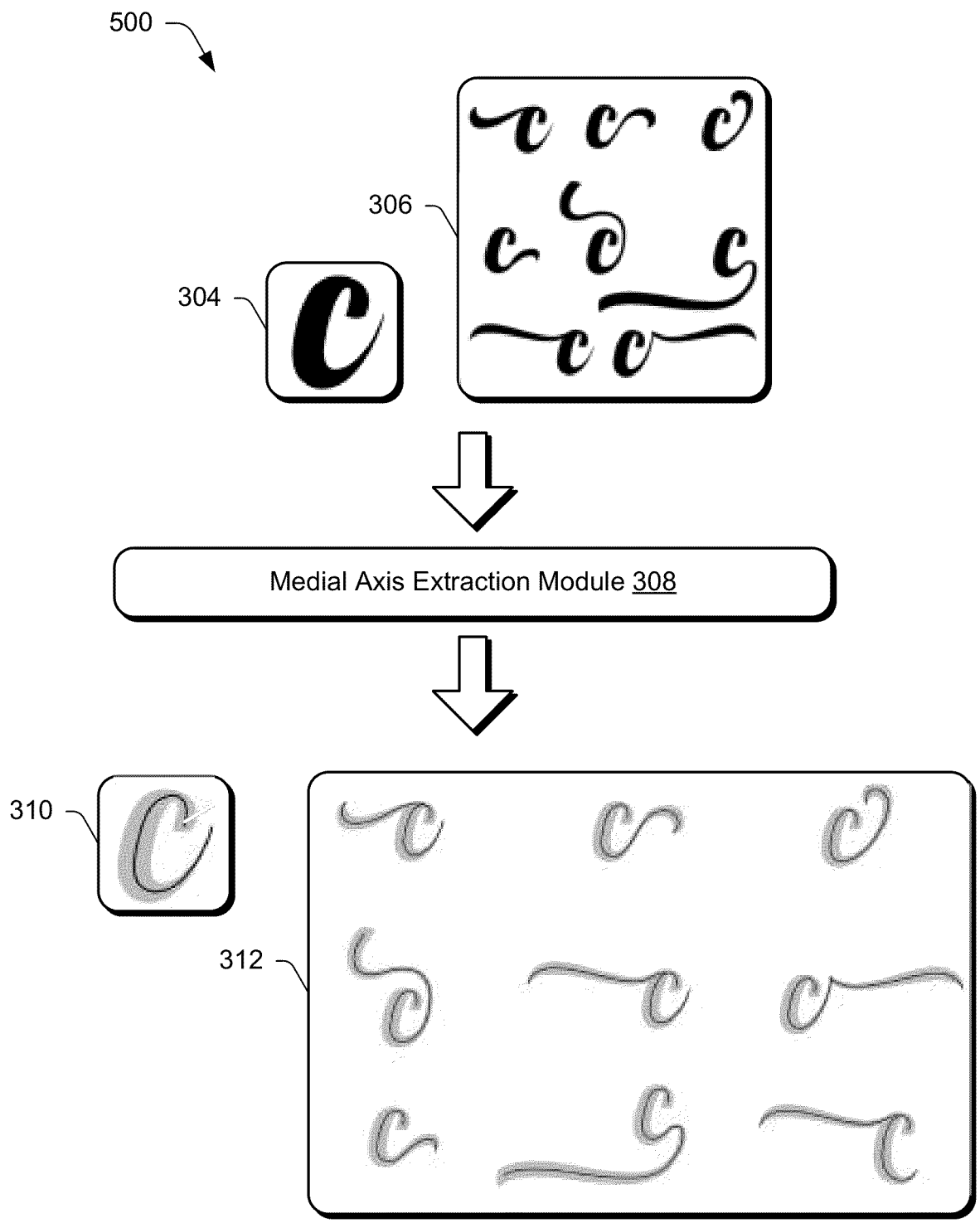
FIG. 5 illustrates an example of medial axis extraction using a skeleton-based technique.

FIG. 2 depicts a system 200 in an example implementation showing operation of the glyph management system 116 of FIG. 1 in greater detail. FIG. 3 depicts a system 300 in an example implementation showing operation of a swash-type detection module of FIG. 2 in greater detail. FIG. 4 depicts a procedure 400 in an example implementation of obtaining an alternate glyph, detecting a swash type, and generating a candidate glyph sequence. FIG. 5 illustrates an example 500 of medial axis extraction using a skeleton-based technique. FIGS. 6-14 depict examples 600, 700, 800, 900, 1000, 1100, 1200, 1300, 1400 of swash-type determination based on a direction of a swash.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-21.

To begin, a glyph swash location system 202 receives an input glyph sequence 204 having an input glyph 206. A glyph input module 208, for instance, receives an input selecting the input glyph 206 as displayed in a user interface 110 (block 402. In this example, the glyph input module 208 determine a font ID 210 and Unicode ID 212 from the input glyph 206. From this, an alternate glyph identification module 214 is configured to obtain alternate glyphs 216 (block 404) from the font 120 corresponding to the font ID 210 and glyphs sharing the Unicode ID 212.

The alternate glyphs 216 are then passed as an input to a swash-type detection module 218. The swash-type detection module 218 is configured in this example to detect a swash type present in the alternate glyph 216 by comparing the input glyph 206 with the alternate glyph 216 (block 406). Detection of other types of additions to the input glyph 206 are also contemplated.

In a font 120, each glyph is present in multiple representations, with one designed a base glyph (e.g., default glyph) and the other as alternate glyphs that provide alternate stylistic representations. Therefore, the alternate glyphs are typically configured as variations of the base glyph, e.g., to include additions as extension around an ascender, descender, and so on.

Accordingly, in this example, the swash-type detection module 218 performs an A-B comparison between a base glyph (e.g., the input glyph 206) and the alternate glyphs 216, respectively, to detect additions and characteristics of the additions of the base glyph to the alternate glyphs. This is used in the swash example to determine a swash type based on a direction of the swash.

To do so, the swash-type detection module 218 uses a correspondence estimation between the input glyph 206 and the alternate glyphs 216. This is used to ascertain which parts of the input glyph 206 correspond to which parts of the alternate glyphs 216. Given two or more glyphs, the correspondence estimate refers to a technique of tracking a set of points in the input glyph 206 that correspond to a set of points of the alternate glyphs 216, e.g., by matching points between the glyphs. Another set of points included in the alternate glyphs 216, respectively, that are not included in the input glyph 206 identify additions made to the input glyph 206 by the alternate glyphs 216, e.g., the swashes.

FIG. 3 depicts a system 300 showing operation of the swash-type detection module 218 in greater detail. The swash-type detection module 218 takes as an input the input glyph 206 and the alternate glyphs 216. Let the input glyph 206 have a Unicode value "Ui" and a list "L" of "{A, A1, A2, A3, ..., An}" represent a list of alternate glyphs also having that Unicode value. A vector extraction module 302 if first employed to extract a vector representation of the input glyph 304 and a vector representation of the alternate glyphs 306, e.g., for each alternate glyph in list "L." The vector representations are configurable in a variety of ways, an example of which includes Bezier curves.

A medial axis extraction module 308 is then leveraged to generate an input glyph medial axis 310 and an alternate glyph medial axis 312 from the vector representations. FIG. 5, for instance, depicts an example 500 of a skeleton-based technique used to generate the input glyph medial axis 310 "Sa" and the alternate glyph medial axis 312 "Sg." A skeleton is a reduced version of a corresponding vector representation depicting a shape that is equidistant to its boundaries. From this, the medial axis extraction module 308 determines a topology of the object. This topology is then used to define a direction of the object as a whole, which is referred to an input glyph medial axis 310 and an alternate glyph medial axis 312.

A medial axis alignment module 314 is utilized to align the input glyph medial axis 310 with the alternate glyph medial axis 312. As a result, the swash-type detection module 218 counters complexities caused by rotations and their corresponding effect on a determination of correspondence between the objects.

The aligned objects are then processed by a swash direction identification module 316 to identify the swash type 220 based on a direction of the swash. Continuing with the example above, the swash direction identification module 316 performs a correspondence estimation between skeleton points of the input glyph medial axis 310 and alternate glyph medial axis 312, e.g., "C[A→G]." Additional points in "Sg" that do not map to points in "Sa" define the swash in this example. Using a glyph origin as a point of reference, baseline as an X axis and vertical center of the input glyph 206 as the Y axis, the swash direction identification module 316 identifies a direction of a point cloud formed using the additional points.

In one example, left, right, top, and bottom extremes of the input glyph 206 are detected by a bounding box generation module 318, which is used to generate corresponding sides of a bounding box 320. An alternative glyph portion module 322 employs a point cluster determination module 324 to determine dense zones in the form of point clusters using density-based clustering of the additional points, e.g., the set of points from the alternate glyphs 216 that do not correspond to the input glyph 206. A convex hull generation module 326 generates a convex hull of each cluster. A convex hull is a polygon that is a smallest convex set that contains the additional points, e.g., as an intersection of convex sets. An intersection determination module 328 is then configured to determine which regions corresponding to respective sides of the bounding box, e.g., which of left, right, top, and/or bottom regions are intersected by the convex hull. Intersection with these regions defines a direction of the extension (e.g., the swash) and consequently the swash type 220 as a beginner, terminal, ascender, or descender swash type.

Figure 6:
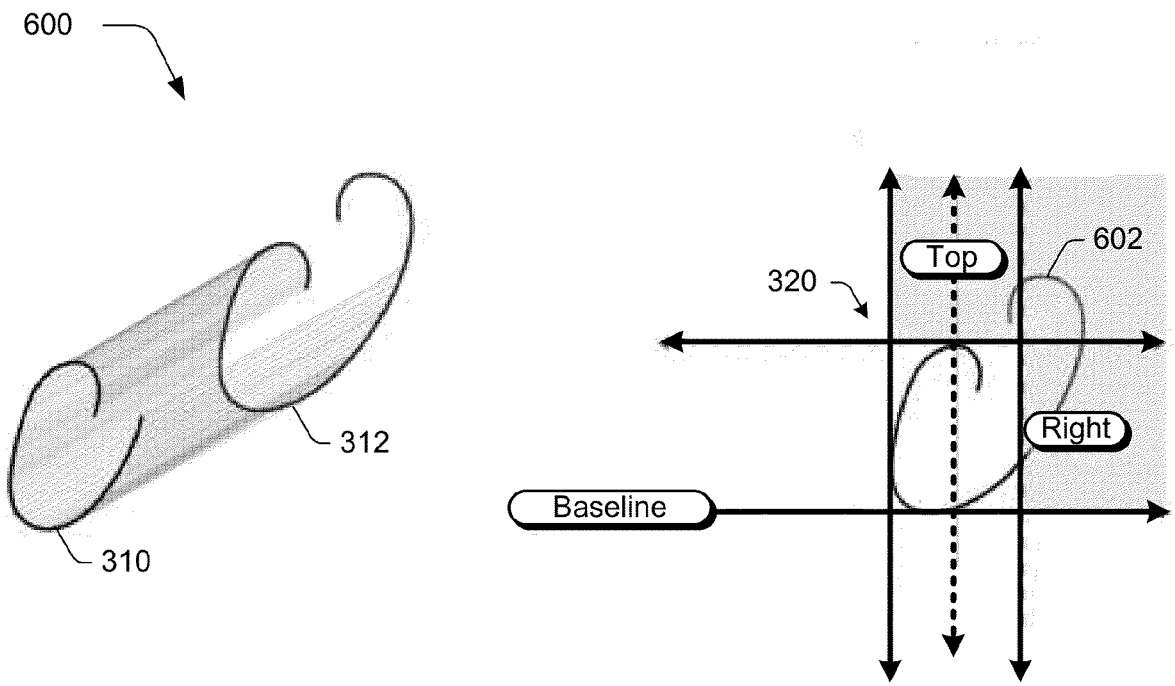
FIGS. 6-14 depict examples of swash-type determination based on a direction of a swash.

FIGS. 6-14 depict examples of swash-type determination based on direction of an addition to the alternate glyph medial axis 312 from the input glyph medial axis 310. In FIG. 6, a correspondence estimation is shown between the input glyph medial axis 310 and the alternate glyph medial axis 312. A bounding box 320 is formed for the input glyph medial axis 310. An additional set of points 602 not included in the correspondence estimation (e.g., a mapping) between the input glyph medial axis 310 and the alternate glyph medial axis 312 intersects top and right regions corresponding to top and right sides of the bounding box 320 and thus defines the alternate glyph 216 as having an ascender swash type and a terminal swash type.

Figure 7:
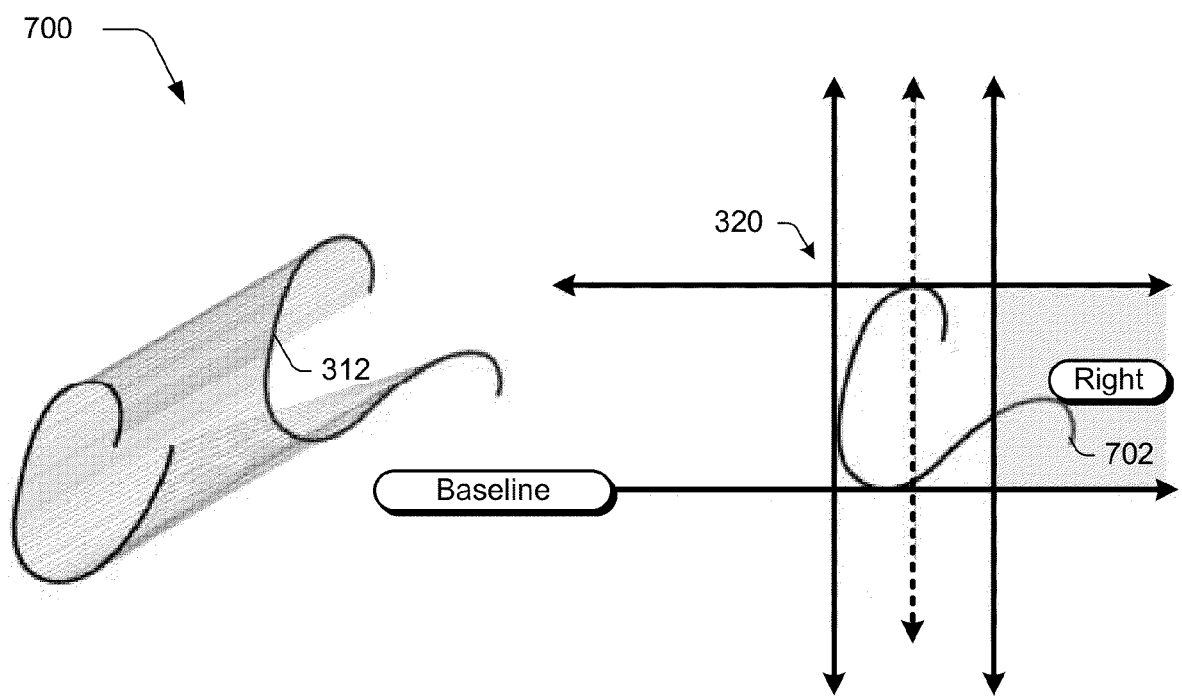

In FIG. 7, a correspondence estimation is shown between the input glyph medial axis 310 and the alternate glyph medial axis 312 along with a bounding box 320 formed for the input glyph medial axis 310. An additional set of points 702 not included in the correspondence estimation (e.g., a mapping) intersects a right region corresponding to a right side of the bounding box 320. This defines the alternate glyph 216 as having a terminal swash type.

Figure 8:
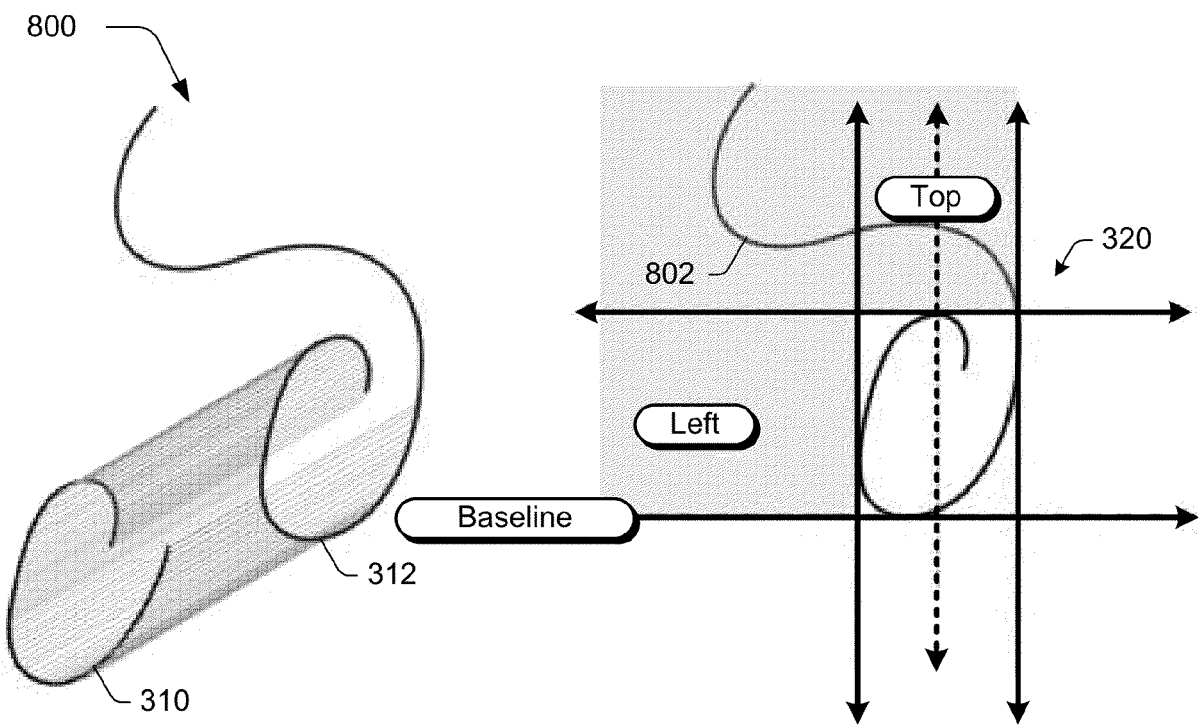

In FIG. 8, a correspondence estimation is also shown between the input glyph medial axis 310 and the alternate glyph medial axis 312. A bounding box 320 is formed for the input glyph medial axis 310. An additional set of points 802 not included in the correspondence estimation (e.g., a mapping) intersects top and left regions corresponding to the top and left sides of the bounding box 320. This defines the alternate glyph 216 as having a beginner and ascender swash type.

Figure 9:
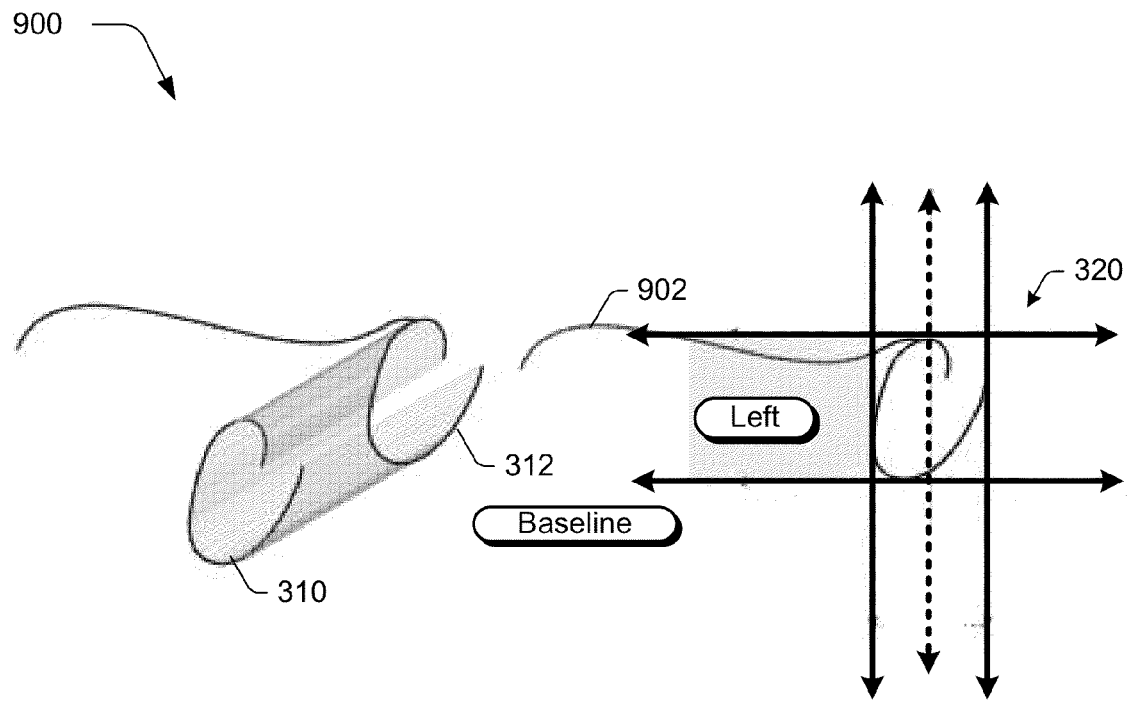

In FIG. 9, a correspondence estimation is depicted between the input glyph medial axis 310 and the alternate glyph medial axis 312 along with a bounding box 320. An additional set of points 902 not included in the correspondence estimation (e.g., a mapping) intersects a left region corresponding to a left side of the bounding box 320. This defines the alternate glyph 216 as having a beginner swash type.

Figure 10:
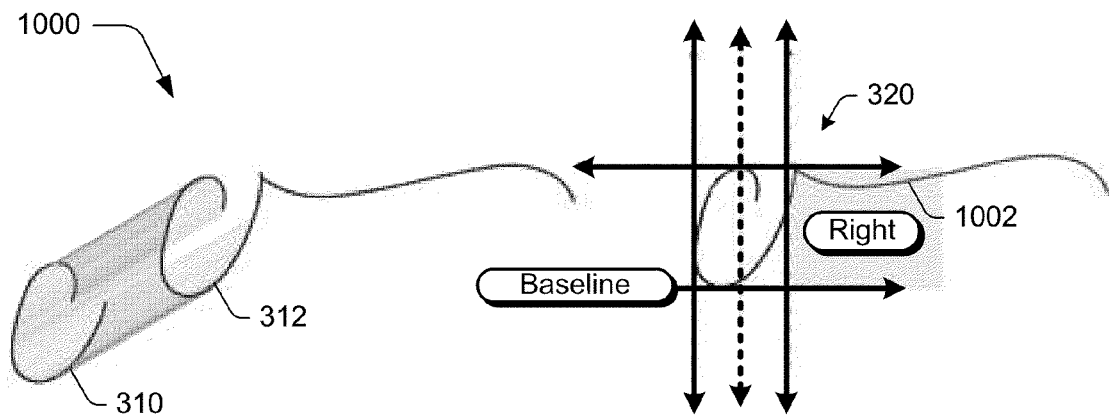

FIG. 10 illustrates a correspondence estimation between the input glyph medial axis 310 and the alternate glyph medial axis 312. A bounding box 320 is generated based on the input glyph medial axis 310. An additional set of points 1002 not included in the correspondence estimation (e.g., a mapping) intersects a right region corresponding to a right side of the bounding box 320 and thus a terminal swash type.

Figure 11:
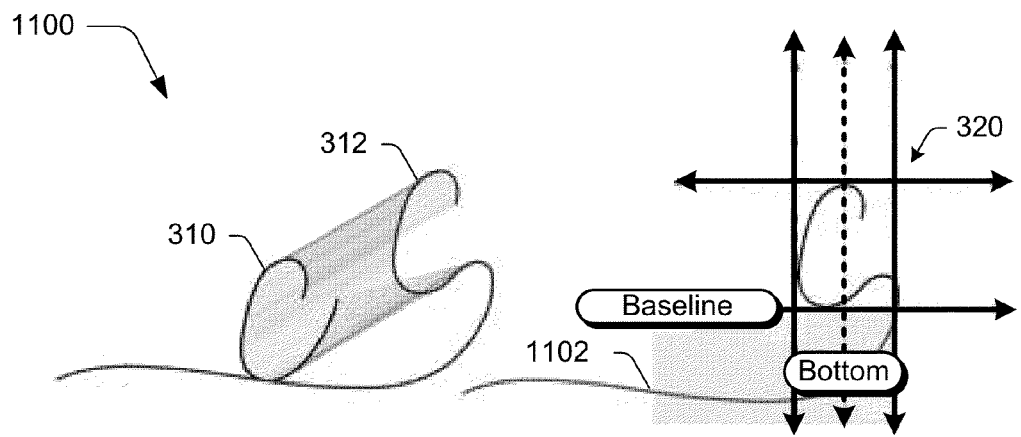

In FIG. 11, a correspondence estimation is depicted between the input glyph medial axis 310 and the alternate glyph medial axis 312 along with a bounding box 320. An additional set of points 1102 not included in the correspondence estimation (e.g., a mapping) extends through a bottom region corresponding to a bottom side of the bounding box 320. This defines the alternate glyph 216 as having a descender swash type.

Figure 12:
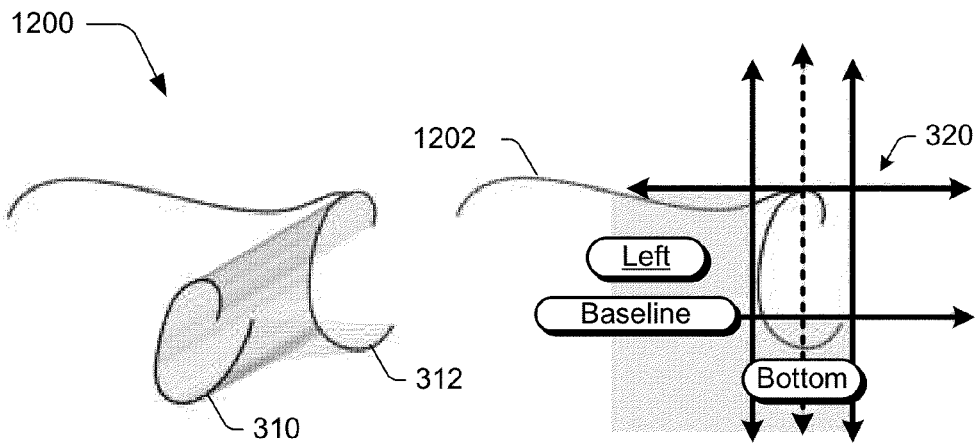

In FIG. 12, a correspondence estimation is shown between the input glyph medial axis 310 and the alternate glyph medial axis 312. A bounding box 320 is formed for the input glyph medial axis 310. An additional set of points 1202 not included in the correspondence estimation intersects left and bottom regions corresponding to the left and bottom sides of the bounding box 320. This defines the alternate glyph 216 as having a beginner and descender swash type.

Figure 13:
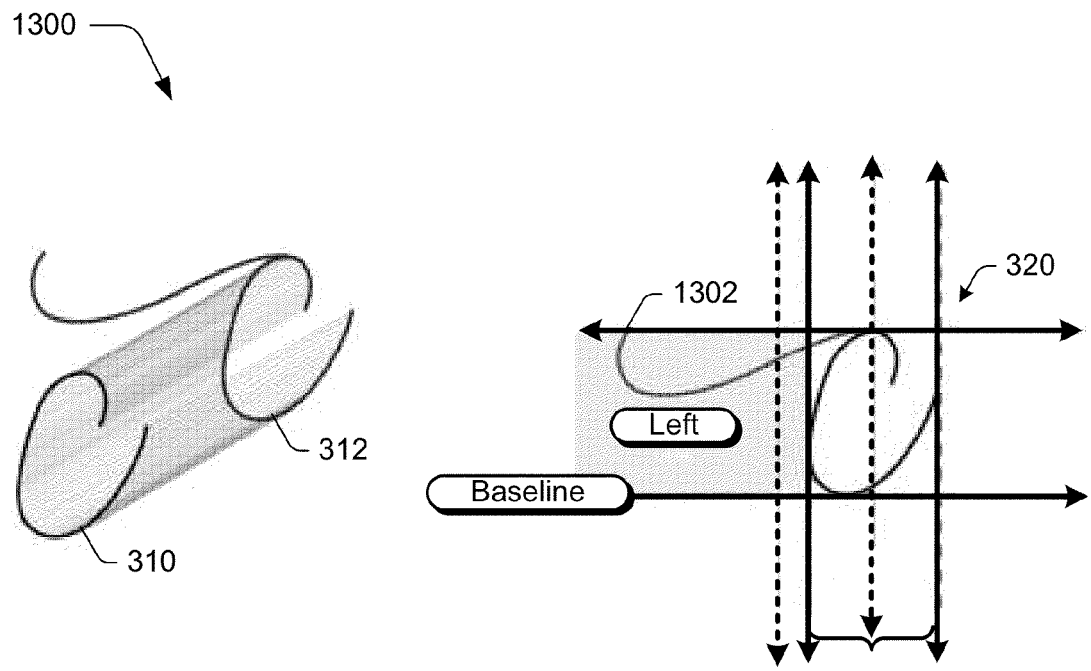

FIG. 13 illustrates a correspondence estimation between the input glyph medial axis 310 and the alternate glyph medial axis 312. A bounding box 320 is generated based on the input glyph medial axis 310. An additional set of points 1302 not included in the correspondence estimation (e.g., a mapping) intersects a left region corresponding to a left side of the bounding box 320 and thus a beginner swash type.

Figure 14:
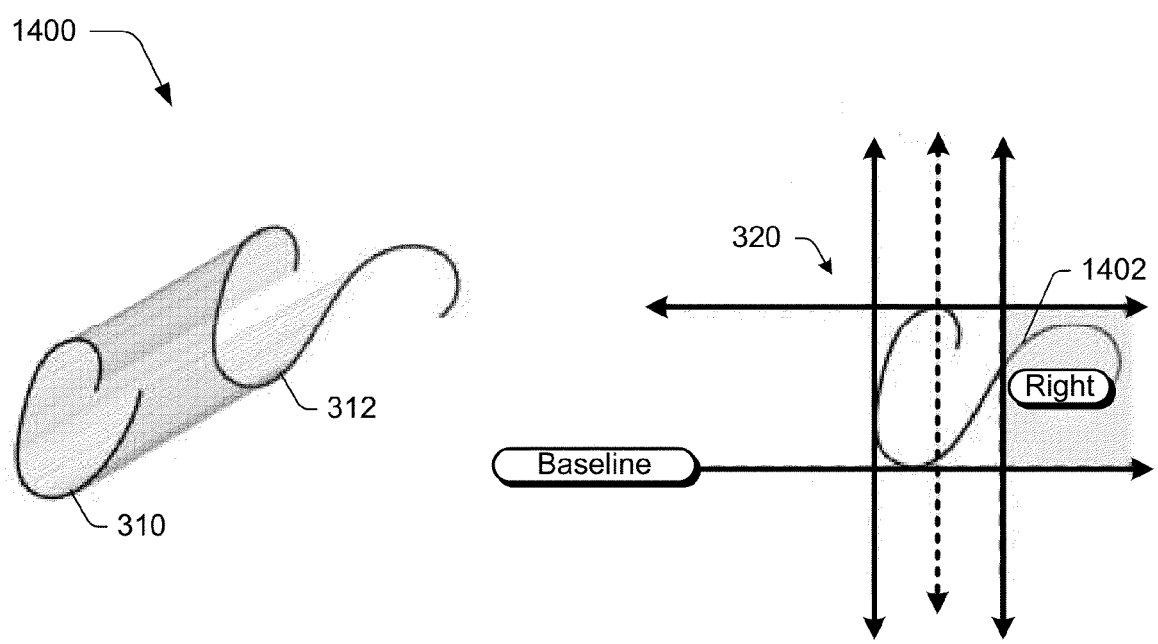

Lastly, FIG. 14 illustrates a correspondence estimation between the input glyph medial axis 310 and the alternate glyph medial axis 312. A bounding box 320 is generated based on the input glyph medial axis 310. An additional set of points 1402 not included in the correspondence estimation (e.g., a mapping) intersects a right region corresponding to a right side of the bounding box 320 and thus a terminal swash type. Thus, as shown above the swash-type detection module 218 is configured to address complex scenarios in which multiple types of extensions are included on a same alternate glyph 216.

Based on the type of addition/extension (e.g., swash type) determined from the alternate glyphs 216, a candidate generation module 222 is configured to generate a candidate glyph sequence 224 including the alternate glyph 216 (block 408), automatically and without user intervention. To do so, the candidate generation module 222 employs a rule 226 to control legibility of the alternate glyph 216 as part of the candidate glyph sequence 224.

Rules that are used to control generation of the candidate glyph sequence 224 are configurable in a variety of ways. In a first example, the rule 226 specifies that a beginner swash alternate glyph or an alternate glyph having a swash in a left direction with respect to a bounding box of the alternate glyph are applied solely to a first glyph in the candidate glyph sequence 224. In a second example, the rule 226 specifies that a terminal swash alternate glyph or an alternate glyph having a swash in a right direction with respect to a bounding box of the glyph are applied solely to a last glyph in the candidate glyph sequence.

In a third example, the rule 226 specifies that an ascender swash alternate glyph or an alternate glyph having a swash in a top direction, top-right direction, or top-left direction with respect to a bounding box of the glyph are not applied to adjacent glyphs within the candidate glyph sequence. In a fourth example, the rule 226 specifies that an ascender swash alternate glyphs having a same direction are at least three glyphs apart in the candidate glyph sequence 224. In a fifth example, the rule 226 specifies that a descender swash alternate glyph or an alternate glyph having a swash in a bottom direction, bottom-right direction, or bottom-left direction with respect to a bounding box of the glyph are not applied to adjacent glyphs within the candidate glyph sequence 224.

Figure 15:
FIG. 15 depicts examples of rules usable to generate a candidate glyph sequence.
Figure 15:
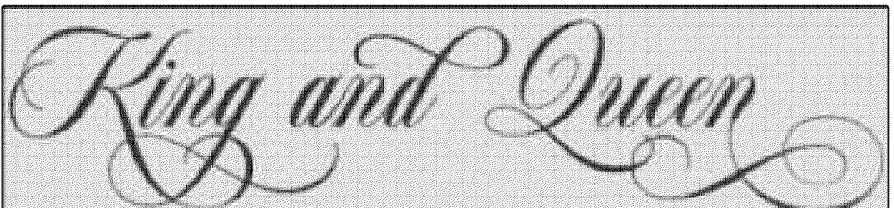
Figure 15:
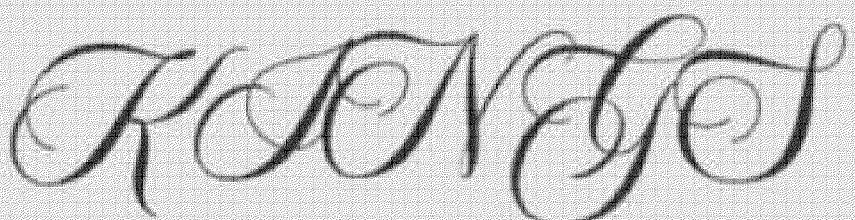

In a sixth example, the rule 226 specifies that descender swash alternate glyphs having a same direction are at least three glyphs apart in the candidate glyph sequence 224. In a seventh example, the rule 226 specifies that at least one default glyph is kept after application of swash alternate types to adjacent glyphs in the candidate glyph sequence 224. In an eighth example, the rule 226 specifies that beginner and terminal swashes are usable, solely, for the candidate glyph sequence 224 when including solely capitalized glyphs. A variety of other examples are also contemplated, examples 1500 of which are depicted in FIG. 15, such as a first rule 1502 that specifies that a swash is to be avoided in the middle of a sequence if compromises legibility, a second rule 1504 that specifies swashes are to be used sparingly, e.g., based on a threshold amount defined using a number of glyphs in the sequence. A third rule 1506 is also shown specifying that use of all caps is to be avoided.

This process may be repeated to form multiple candidate glyph sequences 224, which are then output to a user interface module 228 for display in a user interface 110 (block 410). Selection of the candidate glyph sequence is usable to replace an input glyph sequence in the user interface 110. In an implementation, individual glyphs of the candidate glyph sequence 224 are "lockable" via user input to generate additional candidate glyph sequences 224 having that particular glyph located at a corresponding location within the sequence.

FIGS. 16-19 depict an example workflow as implemented by the glyph management system 116. In the example 1600 of FIG. 16, an input glyph sequence 1602 is depicted as "Adobe." An alternate glyph identification module 214 is employed to obtain alternate glyphs 216 for glyphs in the input glyph sequence 1602. Alternate glyphs of a glyph "A" are shown in a first column 1604, alternate glyphs of a glyph "b" are shown in a second column 1606, alternate glyphs of a glyph "o" are shown in a third column 1608, alternate glyphs of a glyph "b" are shown in a fourth column 1610, and alternate glyphs of a glyph "e" are shown in a fifth column 1612.

Figure 16:
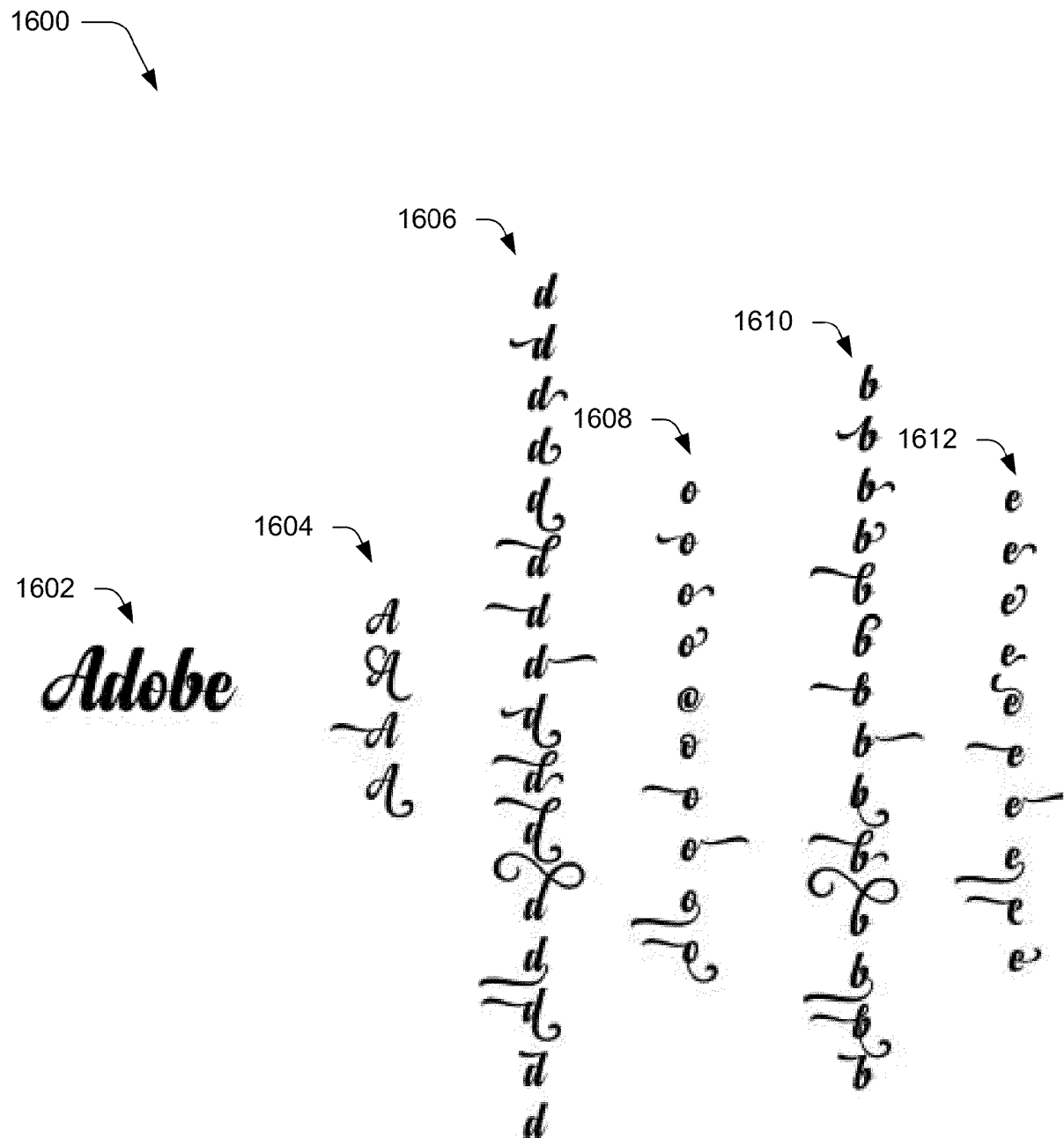
FIG. 16 depicts an example of an input glyph sequence and alternate glyphs obtained for glyphs in the sequence.
Figure 17:
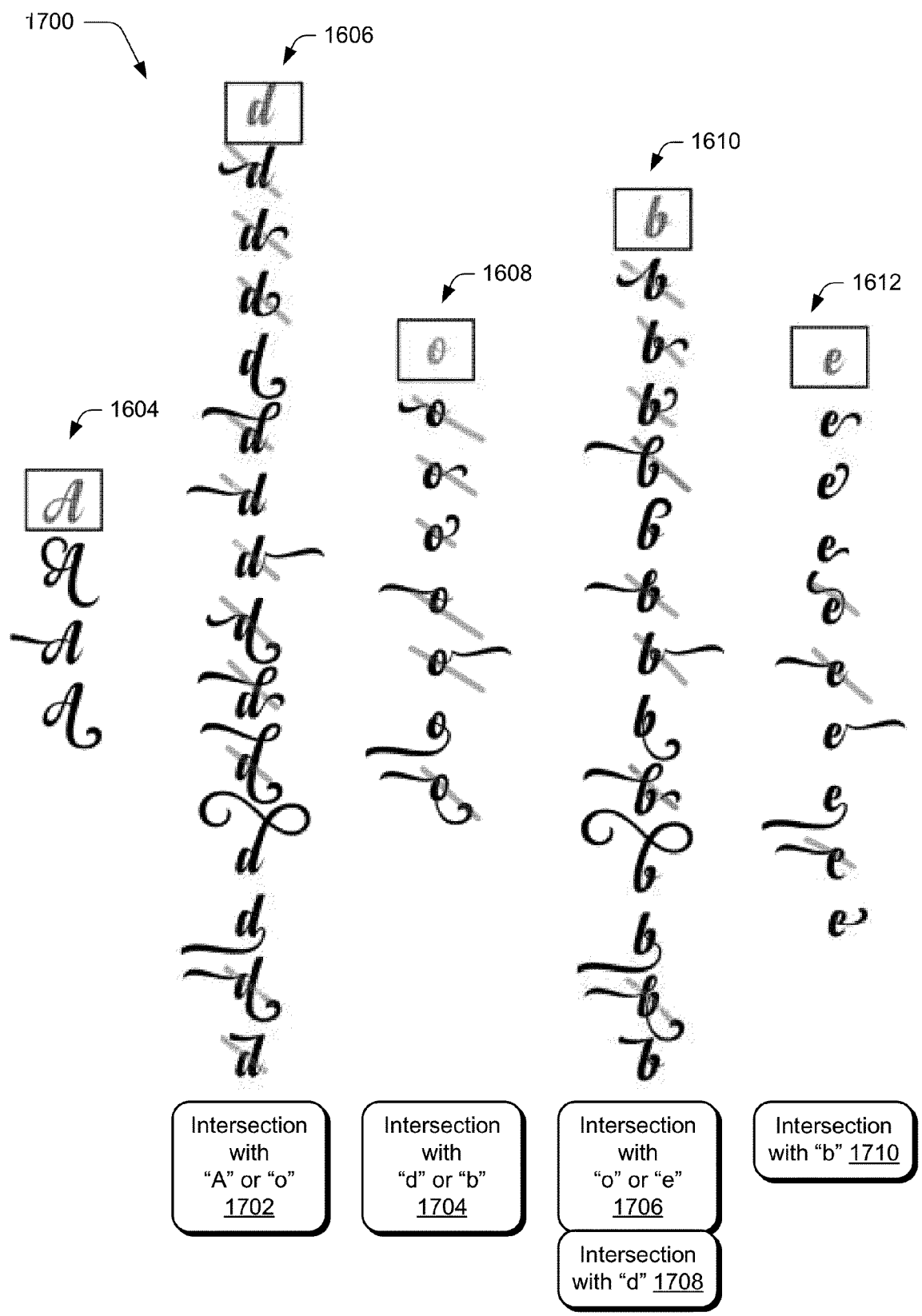
FIG. 17 depicts an example of a candidate generation module utilizing rules to select from the alternate glyphs of FIG. 16 to generate candidate glyph sequences.
Figure 18:
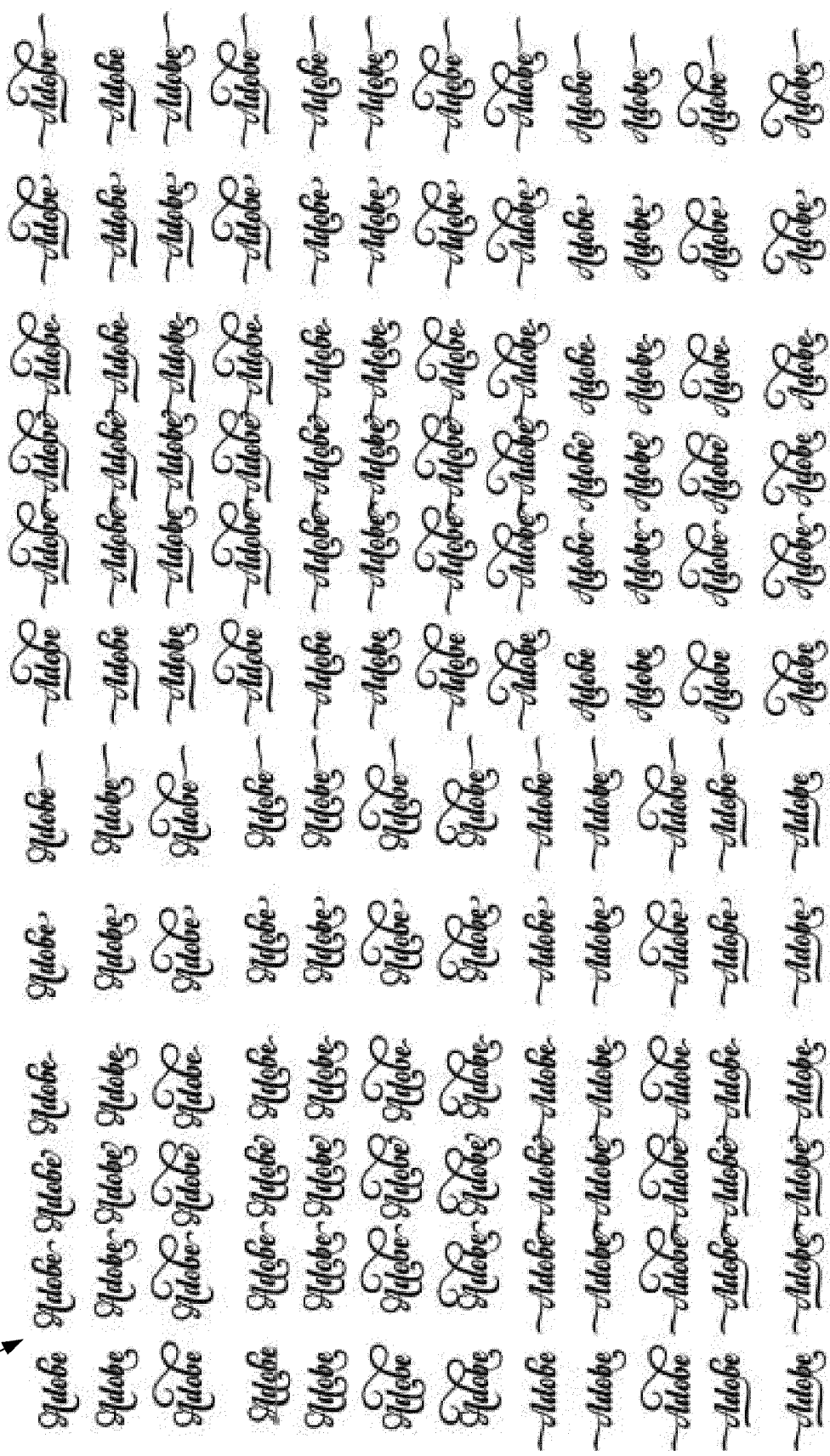
FIG. 18 illustrates examples of candidate glyph sequences including different combinations of base glyphs and alternate glyphs of FIG. 17.
Figure 19:
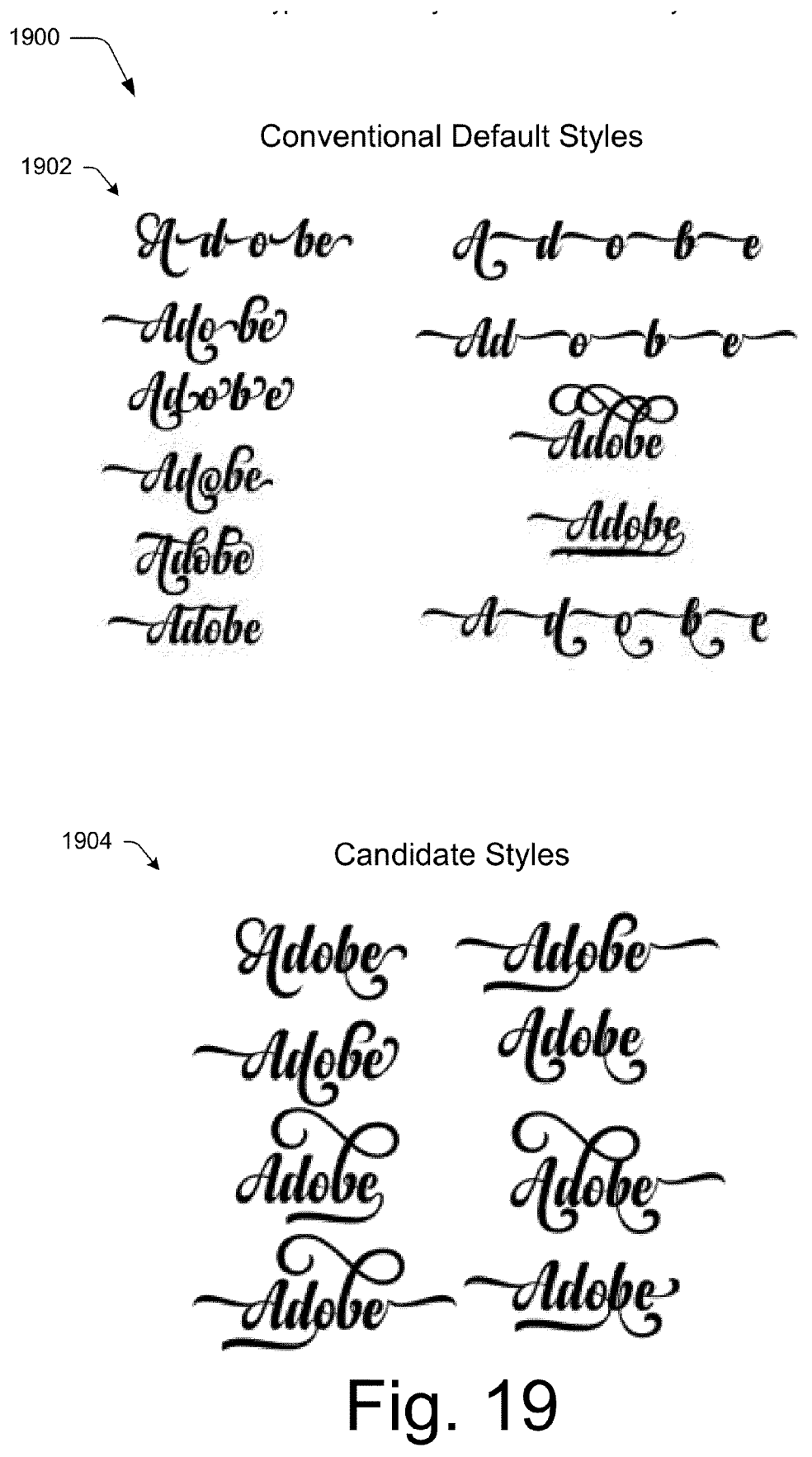

In an example 1700 of FIG. 17, a candidate generation module 222 utilizes rules 226 to select from the alternate glyphs of FIG. 16 to generate candidate glyph sequences 224. In this example, the rules 226 are used to eliminate glyphs that cause overlaps with adjacent glyphs in the sequence. For the second column 1606, alternate glyphs are removed that have an intersection with "A" or "o" 1702. For the third column 1608, alternate glyphs are removed that have an intersection with "d" or "b" 1704. For the fourth column 1610, alternate glyphs are removed that have an intersection with "o" or "e" 1706 or an intersection with "d" 1708. For the fifth column 1612, glyphs are removed having an intersection with "b" 1710. Alternate glyphs that remain are then used by the candidate generation module 222 to generate candidate glyph sequences 224, examples 1800 of which are shown in FIG. 18 that include different combinations of base glyphs and alternate glyphs. In this way, the candidate generation module 222 overcomes the challenges of using of conventional default styles 1902 as shown in the example 1900 of FIG. 19 to generate candidate styles 1904 that are legible and visually pleasing, automatically and without user intervention.

Example System and Device

Figure 21:
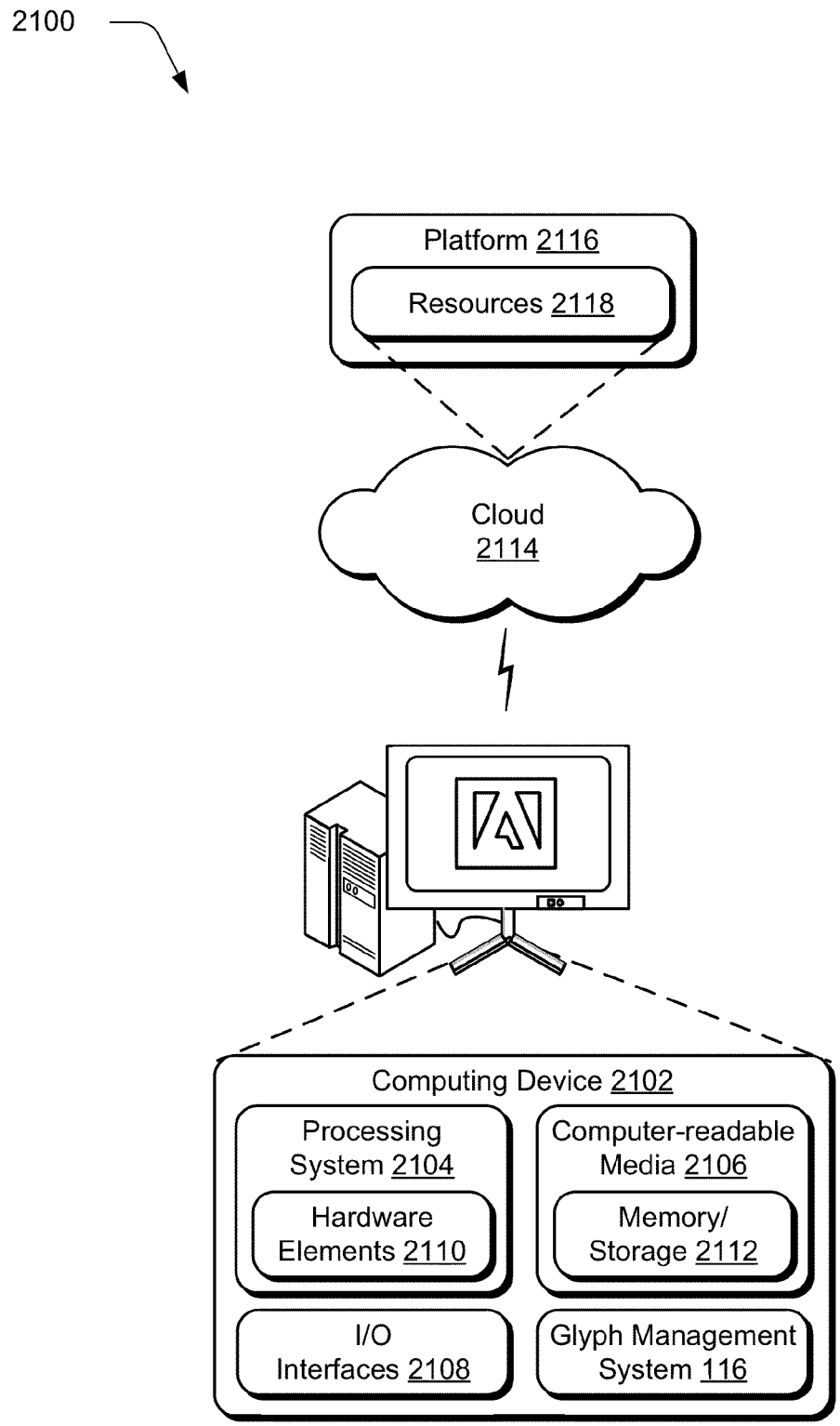
FIG. 21 illustrates an example system including various components of an example device that can be implemented as any type of computing device as described and/or utilize with reference to FIGS. 1-20 to implement embodiments of the techniques described herein.

FIG. 21 illustrates an example system generally at 2100 that includes an example computing device 2102 that is representative of one or more computing systems and/or devices that implement the various techniques described herein. This is illustrated through inclusion of the glyph management system 116. The computing device 2102 is configurable, for example, as a server of a service provider, a device associated with a client (e.g., a client device), an on-chip system, and/or any other suitable computing device or computing system.

The example computing device 2102 as illustrated includes a processing system 2104, one or more computer-readable media 2106, and one or more I/O interface 2108 that are communicatively coupled, one to another. Although not shown, the computing device 2102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2104 is representative of functionality to perform one or more operations using hardware. Accordingly, the processing system 2104 is illustrated as including hardware element 2110 that is configurable as processors, functional blocks, and so forth. This includes implementation in hardware as an application specific integrated circuit or other logic device formed using one or more semiconductors. The hardware elements 2110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 2106 is illustrated as including memory/storage 2112. The memory/storage 2112 represents memory/storage capacity associated with one or more computer-readable media. The memory/storage 2112 includes volatile media (such as random access memory (RAM)) and/or nonvolatile media (such as read only memory (ROM), Flash memory, optical disks, magnetic disks, and so forth). The memory/storage 2112 includes fixed media (e.g., RAM, ROM, a fixed hard drive, and so on) as well as removable media (e.g., Flash memory, a removable hard drive, an optical disc, and so forth). The computer-readable media 2106 is configurable in a variety of other ways as further described below.

Input/output interface(s) 2108 are representative of functionality to allow a user to enter commands and information to computing device 2102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 2102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 2102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2110 and computer-readable media 2106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 2110. The computing device 2102 is configured to implement particular instructions and/or functions corresponding to the software and/or hardware modules. Accordingly, implementation of a module that is executable by the computing device 2102 as software is achieved at least partially in hardware, e.g., through use of computer-readable storage media and/or hardware elements 2110 of the processing system 2104. The instructions and/or functions are executable/operable by one or more articles of manufacture (for example, one or more computing devices 2102 and/or processing systems 2104) to implement techniques, modules, and examples described herein.

The techniques described herein are supported by various configurations of the computing device 2102 and are not limited to the specific examples of the techniques described herein. This functionality is also implementable all or in part through use of a distributed system, such as over a "cloud" 2114 via a platform 2116 as described below.

The cloud 2114 includes and/or is representative of a platform 2116 for resources 2118. The platform 2116 abstracts underlying functionality of hardware (e.g., servers) and software resources of the cloud 2114. The resources 2118 include applications and/or data that can be utilized while computer processing is executed on servers that are remote from the computing device 2102. Resources 2118 can also include services provided over the Internet and/or through a subscriber network, such as a cellular or i-Fi network.

The platform 2116 abstracts resources and functions to connect the computing device 2102 with other computing devices. The platform 2116 also serves to abstract scaling of resources to provide a corresponding level of scale to encountered demand for the resources 2118 that are implemented via the platform 2116. Accordingly, in an interconnected device embodiment, implementation of functionality described herein is distributable throughout the system 2100. For example, the functionality is implementable in part on the computing device 2102 as well as via the platform 2116 that abstracts the functionality of the cloud 2114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by processing system in hardware, the method comprising:
   receiving, by the processing system, an input selecting an input glyph included in an input glyph sequence displayed in a user interface;
   obtaining, by the processing system, an alternate glyph based on the input glyph;

detecting, by the processing system, a swash type present in the alternate glyph by:
  generating a bounding box based on the input glyph;
  ascertaining a side of the bounding box, past which, a portion of the alternate glyph extends; and
  identifying the swash type from a plurality of swash types based on the ascertained side;
generating, by the processing system, a candidate glyph sequence including the alternate glyph, the generating based on the detected swash type and the input glyph sequence; and
displaying, by the processing system, the candidate glyph sequence in the user interface.

2. The method as described in claim 1, wherein the detecting the swash type by comparing the input glyph with the alternate glyph includes:
  tracking a set of points in the input glyph that are identified as matching corresponding points in the alternate glyph using a correspondence estimation;
  identifying the swash as another set of points in the alternate glyph that do not correspond with the input glyph; and
  determining a direction of the swash, the direction identifying the swash type.

3. The method as described in claim 2, further comprising:
  generating an input glyph skeleton from the input glyph and an alternate glyph skeleton from the alternate glyph;
  determining an input glyph medial axis of the input glyph skeleton with an alternate glyph media axis of the alternate glyph skeleton; and
  aligning the input glyph medial axis and the alternate glyph medial axis, and wherein the determining the direction is based on the aligning.

4. The method as described in claim 1, wherein the ascertaining includes:
  determining a point cluster of the portion as part of density-based clustering;
  generating a convex hull of the point cluster; and
  determining an intersection of the convex hull with at least one zone of a plurality of zones defined for respective said sides of the bounding box.

5. The method as described in claim 1, wherein the plurality of swash types includes a beginner swash, a terminal swash, an ascender swash, and a descender swash corresponding to left, right, top, and bottom sides of the bounding box, respectively.

6. The method as described in claim 1, wherein the generating the candidate glyph sequence includes identifying at least one rule of a plurality of rules based on the swash type and applying the at least one rule to the candidate glyph sequence.

7. The method as described in claim 6, wherein the at least one rule specifies that a beginner swash alternate glyph or an alternate glyph having a swash in a left direction with respect to a bounding box of the glyph are applied solely to a first glyph in the candidate glyph sequence.

8. The method as described in claim 6, wherein the at least one rule specifies that a terminal swash alternate glyph or an alternate glyph having a swash in a right direction with respect to a bounding box of the glyph are applied solely to a last glyph in the candidate glyph sequence.

9. The method as described in claim 6, wherein the at least one rule specifies that an ascender swash alternate glyph or an alternate glyph having a swash in a top direction, top-right direction, or top-left direction with respect to a bounding box of the glyph are not applied to adjacent glyphs within the candidate glyph sequence.

10. The method as described in claim 6, wherein the at least one rule specifies that an ascender swash alternate glyphs having a same direction are at least three glyphs apart in the candidate glyph sequence.

11. The method as described in claim 6, wherein the at least one rule specifies that a descender swash alternate glyph or an alternate glyph having the swash in a bottom direction, bottom-right direction, or bottom-left direction with respect to a bounding box of the glyph are not applied to adjacent glyphs within the candidate glyph sequence.

12. The method as described in claim 6, wherein the at least one rule specifies that descender swash alternate glyphs having a same direction are at least three glyphs apart in the candidate glyph sequence.

13. The method as described in claim 6, wherein the at least one rule specifies that at least one default glyph is kept after application of swash alternate types to adjacent glyphs in the candidate glyph sequence.

14. The method as described in claim 6, wherein the at least one rule specifies that beginner and terminal swashes are usable, solely, for the candidate glyph sequence when including solely capitalized glyphs.

15. The method as described in claim 1, further comprising replacing the input glyph sequence with the candidate glyph sequence in the user interface responsive to a user input received via the user interface.

16. A system comprising:
  an alternate glyph identification module implemented at least partially in hardware of a computing device to obtain an alternate glyph based on an input glyph;
  a swash-type detection module implemented at least partially in hardware of the computing device to detect a swash type present in the alternate glyph by:
    generating a bounding box based on the input glyph;
    ascertaining a side of the bounding box, past which, a portion of the alternate glyph extends; and
    identifying the swash type from a plurality of swash types based on a ascertained side; and
  a candidate generation module implemented at least partially in hardware of a computing device to generate a candidate glyph sequence including the alternate glyph based on the swash type.

17. The system as described in claim 16, wherein the alternate glyph identification module is configured to obtain the alternate glyph based on a font ID and Unicode ID associated with the input glyph.

18. A system comprising:
  means for obtaining an alternate glyph based on an input glyph of an input glyph sequence;
  means for generating a candidate glyph sequence including the alternate glyph as replacing the input glyph in the input glyph sequence the generating means including means for identifying at least one rule of a plurality of rules based on a swash type and means for applying the at least one rule to the candidate glyph sequence, the at least one rule specifies that:
    a beginner swash alternate glyph or an alternate glyph having a swash in a left direction with respect to a bounding box of the glyph are applied solely to a first glyph in the candidate glyph sequence;
    a terminal swash alternate glyph or an alternate glyph having a swash in a right direction with respect to a bounding box of the glyph are applied solely to a last glyph in the candidate glyph sequence;
    an ascender swash alternate glyph or an alternate glyph having a swash in a top direction, top-right direction, or top-left direction with respect to a bounding box of the glyph are not applied to adjacent glyphs within the candidate glyph sequence;

an ascender swash alternate glyphs having a same direction are at least three glyphs apart in the candidate glyph sequence;
a descender swash alternate glyph or an alternate glyph having a swash in a bottom direction, bottom-right direction, or bottom-left direction with respect to a bounding box of the glyph are not applied to adjacent glyphs within the candidate glyph sequence;
descender swash alternate glyphs having a same direction are at least three glyphs apart in the candidate glyph sequence;
at least one default glyph is kept after application of swash alternate types to adjacent glyphs in the candidate glyph sequence; or
beginner and terminal swashes are usable, solely, for the candidate glyph sequence when including solely capitalized glyphs; and means for displaying the candidate glyph sequence in a user interface.

19. The system as described in claim 18, wherein the input glyph includes a set of points matching corresponding points in the alternate glyph, the alternate glyph including another set of points adding addition to the set of point in the alternate glyph and are not included in the input glyph.

20. The system as described in claim 16, wherein the plurality of swash types includes a beginner swash, a terminal swash, an ascender swash, and a descender swash corresponding to left, right, top, and bottom sides of the bounding box, respectively.

* * * * *